Feb. 10, 1931.  E. E. MUESER  1,791,933
ELECTRICAL PROSPECTING
Filed Oct. 16, 1926
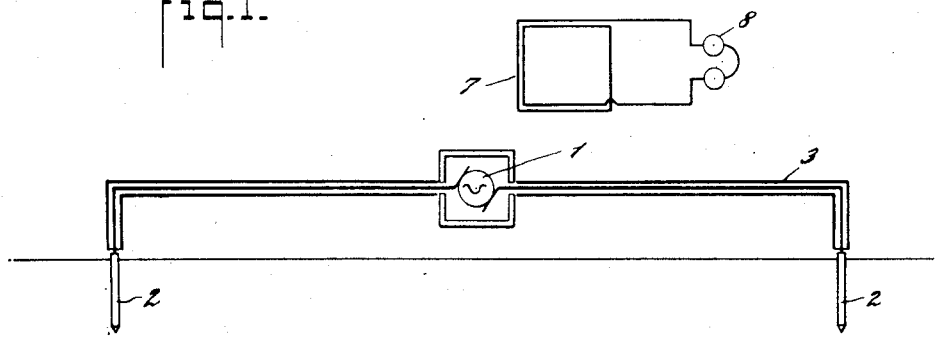
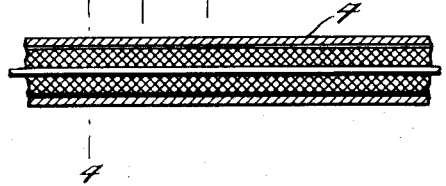
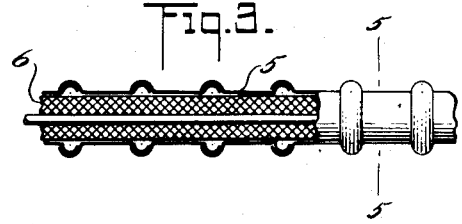
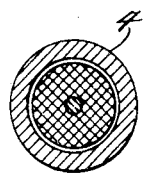
Inventor
EMIL EDWARD MUESER
By His Attorneys
Sheffield & Betts Patented Feb. 10, 1931

1,791,933

UNITED STATES PATENT OFFICE

EMIL EDWARD MUESER, OF MOUNTAIN LAKES, NEW JERSEY

ELECTRICAL PROSPECTING

Application filed October 16, 1926. Serial No. 142,085.

This invention relates to electrical sub-soil prospecting and more particularly to prospecting systems where the region of the earth to be explored is supplied with pulsating or alternating electric currents by means of two spaced electrodes inserted in the earth and connected to a suitable supply of electrical energy such, for example, as a generator.

The object of my invention is to overcome the effect of undesirable magnetic fields set up by the flow of currents through the generator or other supply of electrical energy and through the leads connecting the generator to the electrodes and through other apparatus associated with that part of the system which supplies the current to the earth. The accomplishment of this object greatly facilitates the operation of the apparatus and results in more accurate determination of the character of the sub-soil in the region being explored.

In the apparatus heretofore employed in electrical sub-soil prospecting it has been customary to supply current to the grounded electrodes by means of insulated wires connected to the source of electrical energy or by means of uninsulated wires supported upon posts or stakes driven into the ground so as to keep the wires from contacting with the earth. It is well known that the passage of an electric current through such wires will cause circular magnetic fields to be set up which will spread out from the wires in all directions perpendicular to the wire. The current flowing through the generator, transformers and other apparatus associated with the circuit supplying current to the ground will likewise set up magnetic fluxes in space.

In the prospecting systems to which this invention relates, the character of the sub-soil is determined by its effect upon the magnetic field set up by the flow of current through the earth between the grounded electrodes. Any irregularity in the composition of the soil, such as a deposit of ore therein, will produce a change in the direction and concentration of the lines of current flow which change may be determined above the surface of the earth by causing the pulsating or alternating magnetic flux to traverse a coil of wire connected to a suitable current detecting device, such as a telephone. But this coil of the wire commonly known as "an exploring coil" will also be influenced by the magnetic field produced by currents in the generator and other electrical apparatus located above ground unless the latter field is eliminated. The current detected by the telephone, therefore, would ordinarily be that developed by the passage of the resultant magnetic flux through the coil and not solely that developed from the desired flux which emanates from the earth currents. The presence of any flux of the frequency and character employed in the grounded circuit and effective in the exploring coil other than that which is set up in the earth by current flowing between the electrodes obviously complicates the determination of the character of the sub-soil, and also prevents an accurate determination of the inclination or angle of the lines of magnetic force produced by the earth currents relative to the earth's surface.

In the present invention the undesirable magnetic field is confined to close proximity with the apparatus or connecting wires in which it is produced. This result is accomplished by covering the apparatus and connecting wires with metallic shielding of high permeability and conductivity.

My invention will be better understood from the following description taken in connection with the accompanying drawings, and its scope will be pointed out in the appended claims.

In the drawings illustrating my invention Fig. 1 is a diagrammatical representation of an electrical prospecting system having the generator and connecting wires shielded;

Fig. 2 is a cross-sectional view of a fragment of a connecting wire showing one form of shielding;

Fig. 3 is a partial cross-sectional view of a section of connecting wire showing a preferred form of flexible shielding;

Fig. 4 is a cross-sectional view taken on the line 4—4 of Fig. 2, and

Fig. 5 is a cross-sectional view taken on the line 5—5 of Fig. 3.

In the drawings the numeral 1 indicates a generator supplying alternating current to the grounded electrodes 2 through the connecting wires 3. As illustrated diagrammatically in Fig. 1, the generator 1 and the connecting wires 3 are surrounded by shielding material of metal or alloys thereof having relatively high permeability and conductivity. The purpose of this shielding is, as explained above, to prevent the magnetic field set up in the electrical apparatus located above the earth from influencing the current detecting devices used to determine the magnitude, inclination and direction of the magnetic fluxes emanating from the earth. The shielding used to cover the connecting wires may be in the form of an inflexible metallic tube 4 made of steel, iron, or other material having a high magnetic permeability.

In the preferred embodiment of my invention, the shield is made flexible to facilitate the operation of the apparatus. One form of flexible shielding is shown in Fig. 3 in which the numeral 5 represents interlocking sections of shielding material above referred to and adapted to permit relative movement between adjacent sections. The connecting wires 3 may be kept from contacting with the shielding material 4 or 5 by means of the insulation 6.

The operation of a typical electrical subsoil prospecting apparatus such as is illustrated, may be explained briefly as follows:

The generator 1, supplying a periodically varying current, such as a pulsating or alternating current to the electrode 2, causes an electric current to flow through the earth between the electrodes. This flow of current sets up a field of magnetic flux whose shape is dependent upon the character of the subsoil. If an ore deposit, for example, lies within this field, the relatively high conductivity of the ore will cause a concentration or other variation of the current flow through or around the body of the ore or other mineral deposit, as distinguished from the current flow through a homogeneous medium or a uniform earth or rock formation. The magnitude, inclination and direction of the lines of flux which emanate from the earth will consequently vary according to the character and position of a mineral deposit having a different conductivity from that of the surrounding earth or other natural medium. It is this change in the magnitude, inclination and direction of the flux, indicated by the position of the exploring coil 7 as regards its angle with the surface of the earth and its relation to the true north, when the maximum or minimum sound occurs in the telephone 8, that enables the operator to determine the character of the sub-soil.

Since the only magnetic field that is intended to be active upon the exploring coil is that field which is directly associated with the earth currents, any flux coming from the apparatus above the ground and which influences the receiving apparatus and telephone is undesirable because it complicates the determination of the true magnitude, inclination and direction of the earth currents. The shielding of the apparatus, as described herein, causes the undesirable fluxes to be confined within the shielding material and, owing to the production of eddy currents therein and the Joule effect, prevents the magnetic field produced thereby from interacting with the flux emanating from the earth.

What I claim and desire to protect by Letters Patent is:—

1. In the method of electrical prospecting which comprises determining the direction of the lines of force of the magnetic field produced by artificially generated electric currents flowing through the ground, the improvement which comprises preventing the radiation of any other field than that of the field from the ground conducted currents.

2. In the method of electrical prospecting which comprises determining the direction of the lines of force of the magnetic field produced by artificially generated electric currents flowing through the ground, the improvement which comprises absorbing the fields generated by the electrical currents in the apparatus whereby the radiation of any other field than that of the ground conducted currents is eliminated.

Signed at New York, N. Y., this 14th day of October, 1926.

EMIL E. MUESER.